April 8, 1969   R. J. HEALEY ET AL   3,437,905
VOLTAGE AND CURRENT REGULATOR WITH VARIABLE REFERENCE VOLTAGE
Filed Jan. 16, 1967

INVENTORS R. J. HEALEY
D. S. KIMMEL
BY
ATTORNEY

United States Patent Office 3,437,905
Patented Apr. 8, 1969

3,437,905
VOLTAGE AND CURRENT REGULATOR WITH VARIABLE REFERENCE VOLTAGE
Robert J. Healey, Morristown, and Donald S. Kimmel, Summit, N.J., assignors to Bell Telephone Laboratories, Incorporated, Murray Hill, N.J., a corporation of New York
Filed Jan. 16, 1967, Ser. No. 609,633
Int. Cl. H02m 1/08
U.S. Cl. 321—19                4 Claims

ABSTRACT OF THE DISCLOSURE

A constant-voltage, constant-current switching regulator wherein the crossover process from constant voltage to constant current regulation is accomplished smoothly over a relatively small range of load voltages and currents without competition between the load voltage and load current error detectors.

---

This invention relates to voltage and current regulation and, more particularly, to current and voltage regulator networks which control the crossover from constant-voltage to constant-current regulation.

Voltage and/or current regulation is generally accomplished by either switching regulation where the regulating element or elements are alternately conductive in saturation and nonconductive in cut-off for intervals that are varied in accordance with changes in load, or variable impedance regulation wherein the impedance presented by a continuously conductive regulating element is varied in accordance with changes in load. Both modes of regulation employ error detecting transistors which compare load voltage or load current variations with a reference voltage or current to obtain an error signal which is then fed to the driving and regulating stages to control either the impedance, switching interval, or switching frequency of the regulating element. Constant load voltage or current regulation is thereby obtained.

In combined constant-voltage, constant-current regulation, the load voltage is regulated at a constant value until the load current exceeds a predetermined value and the regulator changes or crosses over from constant-voltage to constant-current regulation. The constant-voltage, constant-current regulators of the prior art employ a load current sensing error detector circuit which is biased into conduction at crossover and competes with the voltage sensing error detector circuit for control of the regulating element. The competition between the voltage and current error detector circuits necessitates the initiation of the crossover process at a load current considerably less than the constant-current output during the constant-current mode of regulation. The crossover portion of the voltage-current regulating characteristic thus extends over a wide range of load voltages and currents and departs significantly from the ideal characteristic wherein crossover occurs at the point of intersection of the constant-voltage, constant-current characteristics.

It is, therefore, an object of this invention to provide a constant-voltage, constant-current regulator wherein crossover is obtained over a relatively small range of load voltages and currents.

In the present invention, the load voltage sensing error detector is incorporated into the load current responsive control loop at crossover by the load current sensing error detector. This is accomplished by allowing the current sensing detector to vary the reference voltage of the voltage sensing detector at crossover and thereby cause the control signal from the voltage sensing detector to respond to load current rather than load voltage variations.

Since the voltage sensing circuit is thus made part of the current regulation control circuit, it does not compete with the current sensing circuit for control of the regulating element and crossover is accomplished smoothly over a relatively small range of load voltages and currents without competition between the error detectors.

Other objects and features of the present invention will become apparent upon consideraion of the following detailed description when taken in connection with the accompanying drawings in which.

Figure 1:
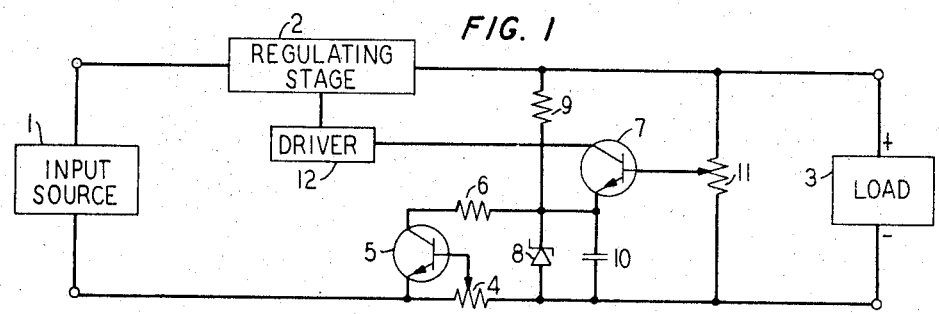
FIG. 1 is a block-schematic diagram of an embodiment of the invention.

In the circuit illustrated in FIG. 1 of the drawing, a source of input supply 1 is serially connected with a regulating stage 2, the load 3, and a current sensing resistor 4. The base and emitter electrodes of the current sensing error detector transistor 5 are connected to a portion of resistor 4 while the collector electrode of transistor 5 is connected through current limiting resistor 6 to the common junction of the emitter electrode of transistor 7 and the cathode electrode of Zener diode 8. Resistor 9 is connected from the common junction of the regulating stage 2 and the load 3 to the cathode electrode of Zener diode 8 to insure conduction through Zener diode 8 in the reverse or Zener direction. The anode electrode of Zener diode 8 is connected to the common terminal of the current sensing resistor 4 and load 3. Capacitor 10 is connected across Zener diode 8 to reduce the diode noise at the breakdown knee portion of the diode characteristic and may be eliminated if the diode has sufficiently low noise characteristics. Potentiometer 11 has its end terminals connected across the load 3 and its wiper arm connected to the base electrode of voltage sensing error detector transistor 7. The collector electrode of transistor 7 is connected to the driver stage 12 which, in turn, is connected to the regulating stage 2 to control the amount of energy supplied by the input source 1 to the load 3.

Figure 2:
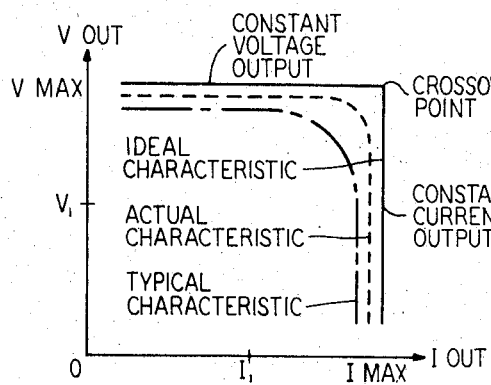
FIG. 2 illustrates constant-voltage, constant-current regulating characteristics useful in discussing the present invention.

The constant-voltage, constant-current regulation principles of the present invention are equally applicable to series and shunt regulation regardless of the mode, i.e., variable impedance or switching, of regulation. The solid plot in the graph of FIG. 2 illustrates an ideal constant-voltage, constant-current regulator characteristic wherein the output or load voltage is constant at $V_{max}$ for a predetermined range of output or load currents up to a predetermined maximum output current $I_{max}$. If the output current should increase to the $V_{max}$, $I_{max}$ point, crossover occurs and the mode of regulation changes from constant-voltage to constant-current. During the constant-current mode of operation, the output current remains constant for a predetermined range of output voltages less than $V_{max}$.

When the circuit of FIG. 1 is operating in the constant-voltage output region of the regulating characteristic, the difference between the variations of the sample of the load voltage appearing across the lower portion of potentiometer 11 and the reference voltage across the Zener diode 8 biases the base-emitter junction of the load voltage error detector transistor 7. The amplified difference signal appearing at the collector electrode of transistor 7 drives the driver stage 12 and varies either the impedance, conductive interval, or switching frequency of the regulating stage 2 to adjust the amount of energy being transmitted from the source 1 to the load 3 in accordance with load voltage variations. The adjustment of potentiometer 4 is predetermined so that, for the general range of load currents less than $I_{max}$, the base-emitter voltage of current sensing error detector transistor 5 will not be sufficient to overcome the inherent threshold voltage of this transistor. Ideally, therefore, transistor 5 will be nonconductive for load currents less than $I_{max}$.

The solid plot constant-voltage, constant-current regulating characteristic of FIG. 2 is, as noted, an ideal characteristic. Since crossover cannot realistically be obtained instantly at a single point, the dotted plot represents an optimum obtainable regulating characteristic. The dashed plot is a typical characteristic, such as might be obtained with the circuits of the prior art, wherein crossover is initiated at a load current $I_1$ (which is considerably less than the maximum load current) and terminated at a load voltage $V_1$ (which is considerably less than the maximum load voltage). From both the dashed and dotted plots, it is readily seen that crossover from the constant-voltage to the constant-current mode of regulation is gradual and that the current sensing error detector is, in fact, biased into conduction prior to the ideal crossover point. In an actual circuit of FIG. 1, the forward threshold voltage of the base-emitter path of transistor 5 is actually overcome as the load current approaches $I_{max}$ and this transistor is biased into conduction. As the regulator enters further into the crossover region on the regulator characteristic, the transistor 5 is being driven deeper into conduction and the voltage drop across its collector-emitter path is therefore decreasing. As the voltage at the collector electrode of transistor 5 decreases, the voltage at the cathode electrode of Zener diode 8, which is connected to the collector electrode of transistor 5 through current limiting resistor 6, must also decrease.

Although the voltage at the cathode electrode of Zener diode 8 is thus decreased, the diode continues to conduct in the inverse direction. This can be most easily seen by referring to the conventional Zener diode characteristic illustrated in FIG. 3. Pont A in FIG. 3 corresponds to the constant voltage region of the FIG. 2 regulator characteristic prior to operation of current sensing error detector transistor 5. At point A, the diode is conducting in the breakdown region. The inverse or Zener voltage across the diode, when the diode is conducting in the region of point A, is relatively constant. As the voltage at the cathode electrode of Zener diode 8 decreases in the manner discussed heretofore, however, the operation of the Zener diode moves from point A on the characteristic to point B. At point B the diode is at the edge of the breakdown region, and the formerly low dynamic impedance of the diode begins to increase as the inverse voltage decreases. As the voltage at the cathode electrode of diode 8 continues to decrease, the inverse voltage across the diode decreases even though the diode is still conducting in the inverse direction. When the voltage at the cathode electrode of the diode continues to decrease past point C, the inverse current flow through the diode is limited to a very small, relatively constant, reverse leakage current. Thus the transition from voltage to current regulation is proportional to the characteristic of the Zener diode. This transition can be made over a smaller range of current and voltage than the forward biased diodes of the prior art. Capacitor 10 reduces the effects of noise between the points B and C of the diode characteristic illustrated in FIG. 3.

Figure 3:
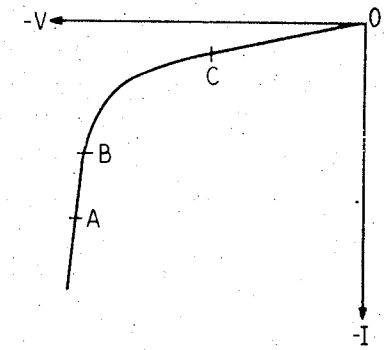
FIG. 3 illustrates the voltage-current characteristic of the reference Zener diode used in the circuits of FIGS. 1 and 4.

If the voltage at the collector electrode of current sensing transistor 5 should decrease due to an increase of load current toward the predetermined maximum load current, the voltage at the cathode electrode of Zener diode 8 would decrease and the diode would begin to operate in the region starting at point B and extending past point C into the leakage current portion on the characteristic illustrated in FIG. 3. A reduction in the voltage at the cathode electrode of Zener diode 8 also reduces the voltage at the emitter electrode of voltage sensing error detector transistor 7 which is connected to the cathode electrode of reference Zener diode 8. Varying the voltage at the emitter electrode of transistor 7 has the same effect as varying the voltage at the base electrode of this transistor during the constant output voltage mode of operation, i.e., the difference signal at the collector electrode of transistor 7 is varied, which, in turn, controls the driving 12 and regulating 2 stages to regulate the amount of energy transmitted from the input source 1 to the load 3. Beginning in crossover region and extending into the constant output current mode of operation, therefore, the regulating stage 2 is at first gradually, and later totally, controlled in accordance with load current variations sensed by transistor 7. It should be noted that the voltage sensing error detector transistor 7 is incorporated into the current sensing control circuit to obtain the constant current mode of operation by varying the point in the Zener diode characteristic of diode 8 at which the diode is operated. As noted heretofore, the circuits of the prior art employed separate voltage and current sensing error detector circuits which competed for control of the regulator in the crossover region. Since the voltage sensing circuit of the present invention is made part of the current sensing control circuit, it does not compete with the current sensing error detector for control of the regulating element and crossover is accomplished smoothly and over a relatively small range of load voltages and currents. In other words, the regulating characteristic of the present invention approaches the ideal actual characteristic shown in FIG. 2 and represents a marked improvement over the typical characteristic of the circuits of the prior art also shown in FIG. 3.

Figure 4:
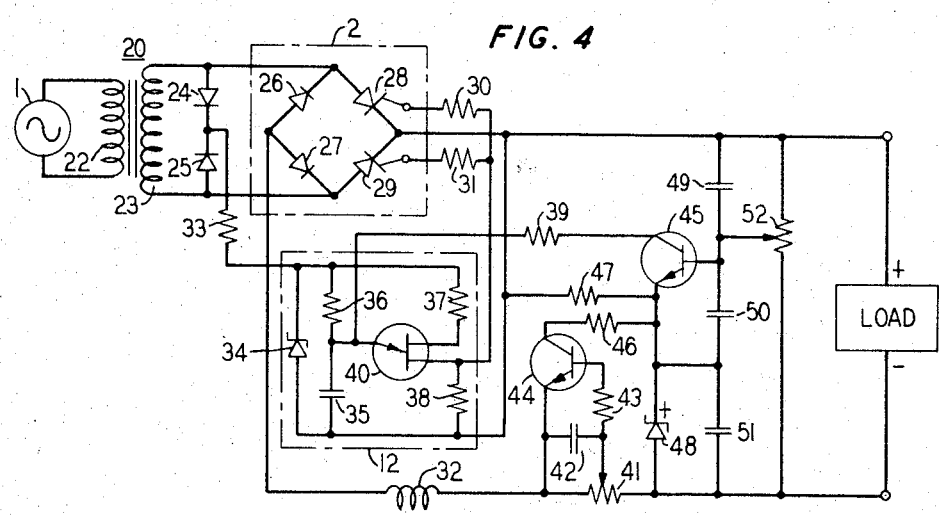
FIG. 4 is a schematic diagram of a useful embodiment of the invention.

The circuit of FIG. 4 illustrates an embodiment of the invention in a switching regulator circuit and shows in detail circuitry which could be employed by the driver 12 and regulator 2 stages. As noted heretofore, variable impedance regulating circuitry, such as that discussed in U.S. Patent 2,904,742 to F. H. Chase, could also be employed in these stages. In the circuit of FIG. 4, transformer 20 has its primary winding 22 connected to the A.C. input source 1 and its secondary winding 23 connected to the input terminals of the full-wave rectifier bridge comprising diodes 26 and 27 and controlled rectifiers 28 and 29. Diodes 24 and 25 are connected back-to-back across the secondary winding 23 to apply the voltage across the secondary winding 23, which also appears across the controlled rectifiers 28 and 29 when they are nonconductive, to the driver circuit 12. The gate electrodes of controlled rectifiers 28 and 29 are connected through current limiting resistors 30 and 31, respectively, to the base-one electrode of unijunction transistor 40. Zener diode 34, which serves to clamp the voltage appearing across the driver network 12, is serially connected with biasing resistor 37, the base-two, base-one electrodes of unijunction transistor 40, and biasing resistor 38. Resistor 36 is serially connected with capacitor 35 across Zener diode 34 to provide a charging path for capacitor 35. Current limiting resistor 33 connects the cathode electrode of Zener diode 34 to the common cathode junction of diodes 24 and 25.

Filter inductor 32, load current sensing potentiometer 41, and the load 53 are serially connected across the output terminals of the bridge comprising diodes 26 and 27 and controlled rectifiers 28 and 29. The base-emitter path of current sensing error detector transistor 44 is serially connected with current limiting resistor 43 across a predetermined portion of potentiometer 41. Capacitor 42 is connected across this portion of potentiometer 41 to phase compensate the effect of A.C. ripple on the current control circuit. Resistor 46, which limits the control current of transistor 44, connects the collector electrode of transistor 44 to the cathode electrode of Zener diode 48, the anode electrode of which is connected to the negative load terminal. Potentiometer 52 is connected across the load 53 and has its wiper arm connected to the base electrode of load voltage sensing error detector transistor 45. To provide circuit stability, capacitor 49 is connected from the positive terminal of the load 53 to the base electrode of transistor 45, and capacitor 50 is connected across the base and emitter electrodes of transistor 45. Capacitor 51 is connected across Zener diode 48 to reduce the effects of noise on the knee of the Zener characteristic illustrated in FIG. 3, as discussed heretofore in connection with capacitor 10.

Resistor 47 connects the cathode electrode of Zener diode 48 to the positive output terminal of the bridge circuit comprising SCR's 28 and 29. Resistor 39 is connected from the emitter electrode of unijunction transistor 40 to the collector electrode of transistor 45 to limit the current flow through the transistor.

In the circuit of FIG. 4, regulation is achieved by controlling the portion of each input half-cycle of the A.C. input source 1 during which either controlled rectifier 28 or 29 is conductive. Conduction through a controlled rectifier is determined by two factors, the forward anode-cathode voltage, and the presence or absence (and, to some degree, magnitude) of a firing pulse at the gate-cathode electrodes. The driver stage 12 of FIG. 4 supplies a firing pulse to the gate electrodes of both controlled rectifiers 28 and 29 during each half-cycle of the A.C. input source 1, and the controlled rectifier which has its anode-cathode path forward (positive) biased by the A.C. input wave is the one through which conduction is initiated. On the following half-cycle (opposite polarity), the previously non-conductive controlled rectifier will be biased into conduction in a similar manner. The conductive controlled rectifier will be cut-off when the input current from the A.C. source falls to a value less than the minimum forward sustaining current flow of the controlled rectifier, i.e., at the end of each input half-cycle.

The operation of voltage sensing error detector 45 and current sensing error detector transistor 44 is the same as the operation of voltage sensing error detector 7 and current sensing error detector transistor 5 in FIG. 1 and is therefore not discussed further at this time.

As discussed in connection with FIG. 1, the voltage sensing error detector transistor 45 controls the driver stage 12 of the regulator both during constant-voltage and constant-current regulation. In the driver stage 12 of FIG. 4, an input half-sinusoid is delivered by either diode 24 or 25 (depending on the polarity of the half-sinusoid) through resistors 33 and 36 to charge the capacitor 35. A portion of the charging current from the diodes will be bypassed by the collector-emitter path of transistor 45 through resistor 39 and Zener diode 48. Since the magnitude of the current flow through the collector-emitter path of transistor 45 is determined by either the load voltage or load current, as discussed in connection with transistors 5 and 7 in the circuit of FIG. 1, variations in load voltage or load current determine the rate of change of the charging current, and hence the stored voltage, of capacitor 35.

Conduction through the emitter-base-one path of unijunction transistor 40, and, in turn, controlled rectifiers 28 and 29, is initiated when the emitter-base-one voltage of the transistor reaches the predetermined portion of the base-one, base-two voltage of the transistor. The voltage appearing across the emitter-base-one electrodes of unijunction transistor 40 is the voltage across the capacitor 35. As noted heretofore, the voltage appearing across capacitor 35 is determined by both the rate of change of the half-sinusoid current appearing at the common cathode junction of diodes 24 and 25 and the portion of this current bypassed by the collector-emitter path of voltage detecting transistor 45. Since the amount of current bypassed through the collector-emitter path of transistor 45 is varied in accordance with either load current or load voltage variations, the charging current to, and the voltage across, capacitor 35 is therefore also varied in accordance with load voltage or current variations. The voltage across capacitor 35, in turn, determines the point in each input half-cycle at which unijunction transistor 40 is biased into conduction and a pulse is applied from its base-one electrode to the gate electrodes of controlled rectifiers 28 and 29 to bias one or the other of these controlled rectifiers into conduction in the manner discussed heretofore. Conduction through the controlled rectifiers is terminated at the end of each input half-cycle and the conduction intervals of the controlled rectifiers are therefore determined in accordance with load voltage or load current variations. Regulation is thus achieved.

It should be noted that transistor 45 controls the rate of voltage charge on capacitor 35 and, in the manner discussed heretofore in connection with FIG. 1, both voltage and current regulation are obtained. In the circuits of the prior art, both the voltage and current sensing circuits would be connected to the capacitor 35, and, as the crossover region from constant-voltage to constant-current regulation was approached, both circuits would compete in an attempt to control the regulating stage. As noted heretofore, crossover thus had to be initiated at a load current considerably less than the maximum load current and the crossover portion of the regulating characteristic therefor covered a relatively large range of load voltages and currents.

In summary, the voltage sensing error detector circuit comprising transistor 45 is incorporated into the regulator control loop at crossover by the current sensing error detector circuit comprising transistor 44. This incorporation is accomplished by connecting the collector electrode of current error detector 44 to the cathode electrode of reference Zener diode 48 so that, at crossover, the reference voltage supplied by the Zener diode is varied in accordance with load current variations. Varying the reference voltage, in turn, causes the control signal from the voltage error detecting transistor 45 to the driving 12 and regulating 2 stages to vary in accordance with load current, rather than load voltage. Since the voltage sensing circuit is thus made part of the current sensing circuit, it does not compete with the current sensing circuit for control of the regulator and crossover from constant-voltage to constant-current regulation is accomplished smoothly and over a relatively small range of load voltages and currents.

As noted heretofore, the novel voltage-current detecting circuit described herein may be used with both switching and variable impedance regulators and for either series or shunt regulation. The arrangements described are illustrative of the principle of the invention. Other embodiments may be devised by those skilled in the art without departing from the spirit and scope thereof.

What is claimed is:

1. A constant-voltage, constant-current regulator comprising a regulating stage, an input source, a load, a current sensing resistor, means serially connecting said source, said regulating stage, said load and said current sensing resistor, said current sensing resistor having a voltage drop thereacross directly proportional to the magnitude of the load current flowing through said current sensing resistor, first and second transistors each having base, collector, and emitter electrodes, means connecting the base and emitter electrodes of said first transistor with a source of reference voltage and at least a portion of the voltage across said load to compare variations of the voltage across said load with said reference voltage, means connecting the collector electrode of said first transistor to said regulating stage to control said regulating stage in accordance with load voltage variations, means connecting the base and emitter electrodes of said second transistor directly across at least a portion of said current sensing resistor to initiate conduction in said second transistor only in response to load current variations which produce a voltage across said current sensing resistor greater than the forward base-emitter threshold voltage of said second transistor, and means connecting the collector-emitter path of said second transistor across said reference voltage source to vary the reference voltage so as to maintain a constant load current when said regulator crosses-over from constant-voltage to constant-current regulation.

2. A constant-voltage, constant-current regulator in accordance with claim 1 wherein said reference voltage source comprises a Zener diode having a capacitor connected thereacross to reduce diode noise during operation on the breakdown knee portion of the diode characteristic at the crossover from constant-voltage to constant-current regulation.

3. A constant-voltage, constant-current regulator comprising a source of input alternating potential, a load, first and second controlled rectifiers each having anode, cathode, and gate electrodes, first and second diodes connected with the anode and cathode electrodes of said first and second controlled rectifiers as a full-wave rectifier bridge having input and output terminals, means connecting said input source to the input terminals of said bridge, a resistor, a filter inductor, means serially connecting the output terminals of said bridge, said filter inductor, said resistor, and said load, a unijunction transistor having an emitter, base-one, and base-two electrodes, means connecting the base-one and base-two electrodes of said unijunction transistor across said source of input potential, a capacitor, means connecting the emitter electrode of said unijunction transistor to said capacitor and said source of input potential, means connecting the base-one electrode of said unijunction transistor to the gate electrodes of said controlled rectifiers, first and second transistors each having base, collector, and emitter electrodes, a potentiometer connected across said load, a Zener diode connected to said input source to continuously supply a reference potential, means serially connecting the base and emitter electrodes of said transistor with the wiper arm of said potentiometer and said Zener diode to compare variations in load voltage with said reference potential, means connecting the collector electrode of said first transistor to said capacitor to control the voltage stored in said capacitor and conduction through said unijunction transistor and said controlled rectifiers in accordance with load voltage variations, means connecting the base and emitter electrodes of said second transistor to at least a portion of said resistor to sense variations in load current which produce a voltage across said resistor greater than the forward base-emitter threshold voltage of said second transistor, and means connecting the collector electrode of said second transistor to said Zener diode to vary the reference voltage supplied by said Zener diode in accordance with said load current variations which produce a voltage across said resistor greater than the forward base-emitter threshold voltage of said second transistor whereby a constant load current is maintained when said regulator crosses over from constant-voltage to constant-current regulation.

4. A constant-voltage, constant-current regulator in accordance with claim 3 wherein a capacitor is connected across said Zener diode to reduce the diode noise at the breakdown knee portion of the diode characteristic.

References Cited

UNITED STATES PATENTS

| | | | |
|---|---|---|---|
| 2,976,475 | 3/1961 | Dodge | 323—9 |
| 3,116,446 | 12/1963 | Healey | 321—47 XR |
| 3,241,035 | 3/1966 | Rhyne | 321—18 |
| 3,300,704 | 1/1967 | McMillen | 320—61 |

JOHN F. COUCH, *Primary Examiner.*

W. M. SHOOP, JR., *Assistant Examiner.*

U.S. Cl. X.R.

323—9, 22